United States Patent
Smith et al.

(10) Patent No.: US 8,203,777 B2
(45) Date of Patent: Jun. 19, 2012

(54) BIAS CONTROLLER

(75) Inventors: Andrew James Smith, Chelmsford (GB); Mohammed Nawaz, Chelmsford (GB)

(73) Assignee: BAE SYSTEMS plc, London (GB)

( * ) Notice: Subject to any disclaimer, the term of this patent is extended or adjusted under 35 U.S.C. 154(b) by 190 days.

(21) Appl. No.: 12/305,621

(22) PCT Filed: Nov. 19, 2008

(86) PCT No.: PCT/GB2008/051083
§ 371 (c)(1),
(2), (4) Date: Jun. 16, 2010

(87) PCT Pub. No.: WO2009/071930
PCT Pub. Date: Jun. 11, 2009

(65) Prior Publication Data
US 2010/0271682 A1    Oct. 28, 2010

(30) Foreign Application Priority Data

Dec. 4, 2007  (EP) .................................... 07270069
Dec. 4, 2007  (GB) .................................... 0723650.8

(51) Int. Cl.
*G02B 26/00* (2006.01)

(52) U.S. Cl. ..................................... 359/239

(58) Field of Classification Search .................. 359/239, 359/237, 238, 245; 398/195, 197, 198, 162, 398/183; 385/2, 8
See application file for complete search history.

(56) References Cited

U.S. PATENT DOCUMENTS 5,495,359 A     2/1996  Gertel et al.
7,440,703 B2 * 10/2008  Shastri et al. ............... 398/183
8,027,591 B2 *  9/2011  Maryfield ..................... 398/170
2004/0028099 A1  2/2004  Hongo et al.
2004/0079866 A1  4/2004  Nishiyama

FOREIGN PATENT DOCUMENTS

EP    0 768 765    4/1997
EP    1 006 591    6/2000

(Continued)

OTHER PUBLICATIONS

U.K. Patent Office, Search Report, Apr. 8, 2008, from related UK Patent Application No. GB 0723650.8, filed on Dec. 4, 2007.

(Continued)

*Primary Examiner* — Ricky Mack
*Assistant Examiner* — Tuyen Tra
(74) *Attorney, Agent, or Firm* — Kenyon & Kenyon LLP (57) ABSTRACT

A bias controller and a method for controlling the bias of an electro-optic modulator are provided. In the method, for a received indication of modulator temperature, steps are provided for accessing a look-up table to determine a corresponding value of bias voltage, for a required bias point, to apply to the modulator. If no such value is stored, additional steps are provided to generate a pilot tone for input to the modulator and to recognize, from the signal content of a modulated optical signal output by the modulator, operation of the modulator at the required bias point, adjusting the value of bias voltage being applied to the modulator as required. When operation at the required bias point is recognized, the respective value of bias voltage for that modulator temperature is stored in the look-up table. The same method is provided to configure a bias controller in respect of a given modulator, if necessary ab initio.

6 Claims, 3 Drawing Sheets

FOREIGN PATENT DOCUMENTS

| | | |
|---|---|---|
| EP | 1 217 701 | 6/2002 |
| JP | 09-211400 | 8/1997 |
| JP | 10-115813 | 5/1998 |
| WO | WO 03/069379 | 8/2003 |

OTHER PUBLICATIONS

European Patent Office, Search Report, Jun. 11, 2008, from related European Patent Application No. EP 07270069.3, filed on Dec. 4, 2007.

Japanese Patent Office, Translation of Notice of Reasons for Rejection, Dec. 21, 2010, from related Japanese Patent Application No. 2009-544452.

European Patent Office, International Search Report and Written Opinion, Feb. 23, 2009, from International Patent Application No. PCT/GB2008/051083, filed on Nov. 19, 2008.

* cited by examiner

BIAS CONTROLLER

RELATED APPLICATION INFORMATION

This application is a United States National Phase Patent Application of International Patent Application No. PCT/GB2008/051083 which was filed on Nov. 19, 2008, and claims priority to British Patent Application No. 0723650.8, filed on Dec. 4, 2007, and claims priority to European Patent Application No. 07270069.3, filed on Dec. 4, 2007, the disclosures of each of which are incorporated herein by reference.

FIELD OF THE INVENTION

This invention relates to bias controllers, in particular, but not exclusively, to a bias controller for electro-optic modulators, for example for so-called Mach-Zehnder modulators. Such modulators have utility, in particular, in the field of optical communications systems.

BACKGROUND INFORMATION

It is known, in particular for Mach-Zehnder electro-optic modulators, for it to be necessary in certain applications to make periodic adjustments to biasing of the modulator to ensure that it continues to operate at or near a quadrature point. There are various reasons why during operation of a Mach-Zehnder electro-optic modulator a given modulating voltage level will result in a slightly inconsistent optical output level from the modulator. That is, the bias point—the voltage that needs to be applied to a bias electrode for example in order to return the modulator to or near a quadrature point—is prone to drift over time. This may be due to trapped charges in the modulator waveguide, temperature variations or other effects.

Temperature variations in particular are likely to result in physical changes to the length of the interferometer in a Mach-Zehnder modulator for example, with consequent variations in the bias point. There are certain types of Mach-Zehnder Interferometer (MZI) optical modulator which have a bias point that remains electrically stable over time (i.e. no trapped charge or similar drift effects). Such a modulator is still, however, temperature-sensitive: any variation in temperature changes the length of the interferometer. As the interferometer in a Mach-Zehnder modulator is asymmetric, the length of the asymmetry is also altered with varying temperature and therefore the bias point shifts, requiring an adjustment to an applied dc bias voltage to correct it.

SUMMARY OF THE INVENTION

From a first aspect, the present invention resides in a method for controlling the bias of an electro-optic modulator, including the steps of:

(i) receiving an indication of the temperature of the modulator;

(ii) accessing a look-up table to determine a value of bias voltage corresponding to the received indication of modulator temperature, for a required bias point;

(iii) generating a bias voltage of the determined value for application to the modulator; and (iv) in the event that, at step (ii), the look-up table does not contain a value for bias voltage for the required bias point, the method further includes the steps of:

(v) generating a pilot tone for input to the modulator;

(vi) determining the signal content of a modulated optical signal output by the modulator to thereby recognize operation of the modulator at the required bias point;

(vii) if, at step (vi), the modulator is not operating at the required bias point, adjusting the value of bias voltage for application to the modulator;

(viii) repeating steps (vi) and (vii) until operation at the required bias point is recognized; and (ix) storing the respective value of bias voltage and the received indication of modulator temperature in said look-up table.

These additional steps (v) to (ix) enable the look-up table to be populated with new information during operation of the bias controller, for example if a value of modulator temperature is encountered for which there is no corresponding value of bias voltage stored in the look-up table, or where the look-up table is initially empty. Possibly, having stored a new value of bias voltage, the pilot tone is terminated.

At step (vi), in order to recognize operation of the modulator at particular bias points, determining the signal content may include monitoring the amplitude of signals in the modulated optical signal output is monitored, in particular with the aim of detecting a substantial maximum or a substantial minimum amplitude in such signals, at one or more frequencies. These frequencies may include, in particular, the fundamental frequency of the pilot tone and the frequency of the second harmonic of the pilot tone. A pilot tone of frequency in the range 10 to 100 kHz may be used, for example of 20 kHz.

If operation of the modulator at quadrature bias is required, then at step (vi), the quadrature bias point of the modulator is recognisable by a substantially maximum signal amplitude at the fundamental frequency of the pilot tone and a substantially minimum signal amplitude at the frequency of the second harmonic of the pilot tone.

If operation of the modulator at a maximum or a minimum bias point is required, then at step (vi), a maximum or minimum bias point of the modulator is recognisable by a substantially minimum signal amplitude at the fundamental frequency of the pilot tone and a substantially maximum signal amplitude at the frequency of the second harmonic of the pilot tone. The maximum or minimum bias points are distinguishable additionally by monitoring the DC content of the signal power output by the modulator.

From a second aspect, the present invention resides in a method for configuring a bias controller for controlling the bias of an electro-optic modulator, wherein the bias controller includes:

an input for receiving an indication of the temperature of the modulator;

a generating arrangement for generating a bias voltage to be applied to the modulator;

a store for storing a look-up table containing, for each of a plurality of temperature points a corresponding bias voltage to be applied to the modulator in respect of a required bias point; and a control arrangement operable, with reference to the look-up table, to determine a bias voltage to be applied to the modulator for a received indication of modulator temperature, the method including the steps of:

(i) receiving an indication of the temperature of the modulator;

(ii) generating a pilot tone for input to the modulator;

(iii) generating a bias voltage for application to the modulator;

(iv) determining the signal content of a modulated optical signal output by the modulator to thereby recognize operation of the modulator at a required bias point;

(v) if, at step (iv), the modulator is not operating at the required bias point, adjusting the value of the generated bias voltage;

(vi) repeating steps (iv) and (v) until operation at the required bias point is recognized; and (vii) for the required bias point, writing the respective value of bias voltage and the received indication of modulator temperature to the look-up table in the store of the bias controller.

This enables the bias controller to be configured ab initio, or to be updated with information on bias voltage values for previously undetected modulator temperatures, for example.

DETAILED DESCRIPTION

Exemplary embodiments of the present invention will now be described in more detail, by way of example only, with reference to the accompanying drawings.

An exemplary embodiment of the present invention will now be described in the context of a Mach-Zehnder Interferometer (MZI) modulator for which it is assumed that the bias point is electrically stable over time and that the only significant cause of bias point drift during operation of the modulator are effects due to temperature variation. An outline of the structure and principles of operation of an MZI modulator will firstly be provided with reference to FIG. 1 and to FIG. 2.

Figure 1:
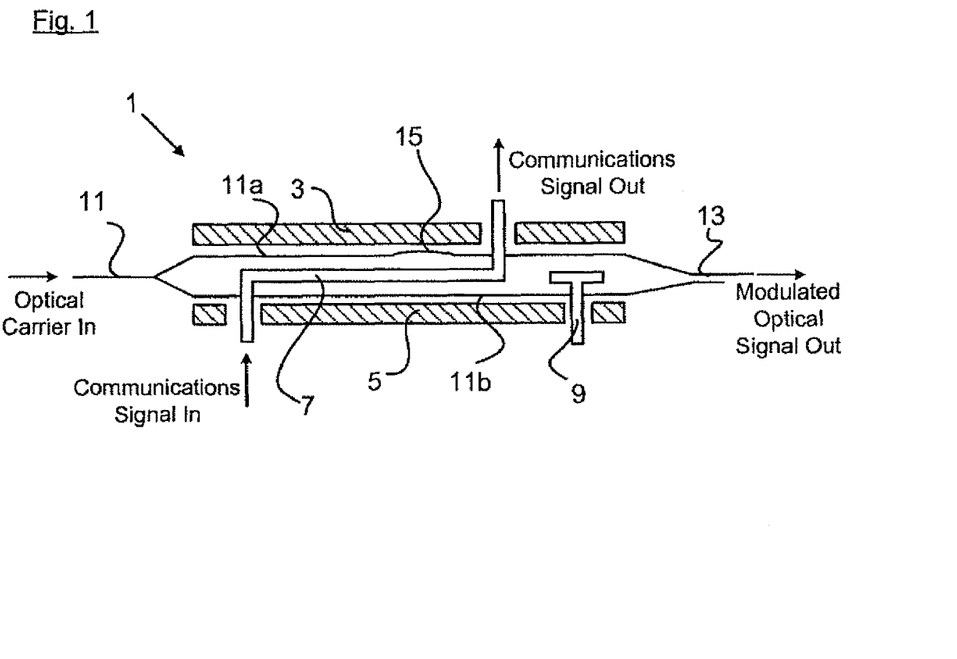
FIG. 1 is an illustrative schematic representation of a typical Mach-Zehnder interferometer (MZI) modulator.

Referring firstly to FIG. 1, an illustrative schematic representation is provided of a known MZI modulator 1 of the type that is often employed in optical communications systems.

MZI modulators provide a mechanism whereby an input optical carrier signal may be modulated with a communications signal, for example with an RF communications signal. In this example the modulator includes an interferometer, created by forming an optical waveguides in a suitable substrate such as Lithium Niobate (LiNbO$_3$) or Gallium Arsenide (GaAs) or Indium Phosphide (InP). The waveguide 11 of the modulator depicted in FIG. 1 is split into two branches 11a, 11b, one of which (11a in this example) includes a small asymmetry 15 that functions to introduce a phase difference between light travelling down the respective branches 11a, 11b of the waveguide 11, typically 90° at the wavelength of operation. The light passing through each waveguide 11a, 11b is recombined at an optical coupler 13. A typical operational wavelength for the light is in the region of 1300 or 1550 nanometers.

An optical carrier signal, possibly in the form of a beam of light from a laser, enters the modulator waveguide 11 from the left of FIG. 1 and exits the modulator from the coupler 13 at the right of FIG. 1 having passed through both branches of the waveguide. The MZI modulator 1 may provide either a single optical output from the coupler 13 or it may provide two optical outputs, one from which the optical output signal is 180° out of phase with the optical output signal from the other output. The present invention is intended for operation with both the single and dual output form of MZI modulator.

Lithium Niobate (in common with other potential optical waveguide materials such as GaAs or InP) is a glass-like material with a crystal structure that exhibits an electro-optic effect whereby the refractive index of the crystal structure changes as a voltage is applied thereto. In particular, the direction of the electric field induced by the applied voltage causes an increase or decrease in refractive index—an increased refractive index acting to slow light travelling through the crystal, and a decreased refractive index acting to increase the speed of light travelling through the crystal. In MZI modulators, the Lithium Niobate material is usually arranged so as to have an X cut, Y propagate crystal orientation with respect to the input optical signal, and in this context an electric field applied in the X direction (positive or negative) causes a change in the refractive index of the material that affects the speed of the light passing along the Y axis.

As shown in FIG. 1, a modulating electrode 7 is provided between the branches 11a, 11b of the waveguide, and when this electrode is energized by an applied signal (for example by a radio frequency or digital communications signal), positive and negative electric fields are established between the modulating electrode 7 and, respectively, first 3 and second 5 ground planes. The modulating electrode is designed as a transmission line so that the modulating signal travels with the optical carrier signal through the modulator, thereby enabling high modulating frequencies to be achieved.

The positive and negative electric fields cause the refractive index of the two branches 11a, 11b of the waveguide 11 to change (the positive field causing an increase in refractive index for branch 11a, and the negative field causing a decrease in refractive index for branch 11b), and the resulting different propagation speeds of the optical carrier signal through each branch cause a change in phase in the signals output to the optical combiner 13, which phase change causes the output level of light from the optical combiner 13 to change. In effect, as the electric fields experienced by each branch varies with the communications signal applied to the modulating electrode, so the phase difference between light passing through the two branches changes and the output level of the optical signal output from the combiner 13 varies accordingly. The net effect of this is that the input optical carrier signal is modulated with the communications signal applied to the modulating electrode 7.

Figure 2:
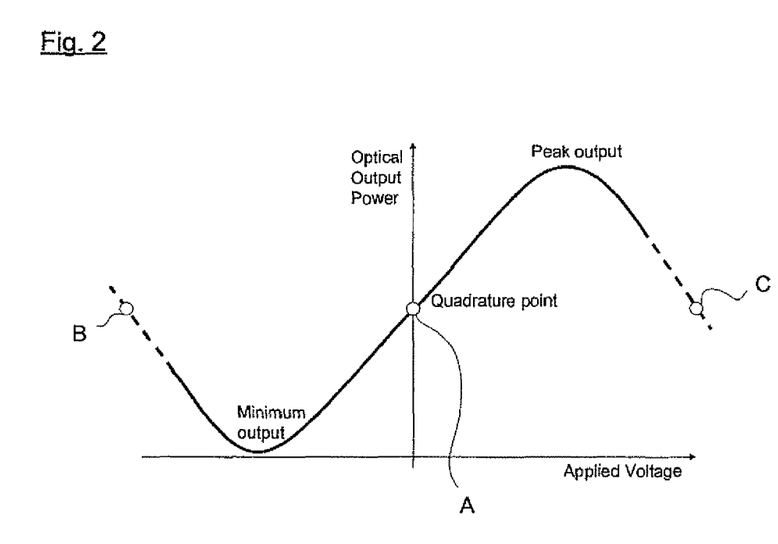
FIG. 2 is a graph showing a portion of a typical transfer characteristic for the MZI modulator shown in FIG. 1.

Referring now to FIG. 2 of the accompanying drawings, the overall transfer characteristic of the modulator is shown to be approximately sinusoidal according to the applied voltage, with the most linear modulation being achieved in and around a quadrature point (also known simply as "quadrature", both terms being used interchangeably herein), namely a point where there is a 90° phase relationship between light travelling through respective branches 11a, 11b of the waveguide and the optical output power is approximately half the peak output power. The transfer function is a repeating function, and as such there are many quadrature points at different applied voltages but all with nominally the same power output. Indicated in FIG. 2 is a first quadrature point A. An MZI modulator is typically manufactured so that when the applied voltage is zero the modulator is close to quadrature. At the quadrature point A, where the output power is increasing with applied voltage, this quadrature point is referred to as a positive slope quadrature point. Also indicated are two further quadrature points B and C where the output power is decreasing with applied voltage, and these quadrature points are each referred to as negative slope quadrature points.

In practice, as mentioned above, the value of applied voltage corresponding to a given quadrature point tends to drift during operation of the modulator, due to various effects. For the purpose of the present invention, the principal cause of drift in the position of quadrature points is varying temperature of the modulator. In order to maintain predictable levels of output power for a given applied voltage at the modulating electrode 7 in particular, adjustments need to be made to the overall voltage being applied to the modulator to compensate for the drift in position of the quadrature points. This voltage adjustment is known as a "bias" voltage and may be applied in two main ways: as a DC voltage adjustment that may be combined with a modulating voltage being applied to the modulating electrode 7 using a bias-Tee; or as a separate DC bias voltage applied to a dedicated bias electrode 9, as would be apparent to a person of ordinary skill in this field.

Exemplary embodiments of the present invention are directed to a determination of what the bias voltage should be at any particular time during operation of the modulator. In particular, assuming that the principal reason for needing to vary the bias voltage is a change in temperature of the modulator and the effects occurring as a consequence, an exemplary embodiment of the present invention is directed to a bias controller for determining the bias voltage to be applied for a given modulator temperature. This bias controller will now be described with reference to FIG. 3 and FIG. 4.

Figure 3:
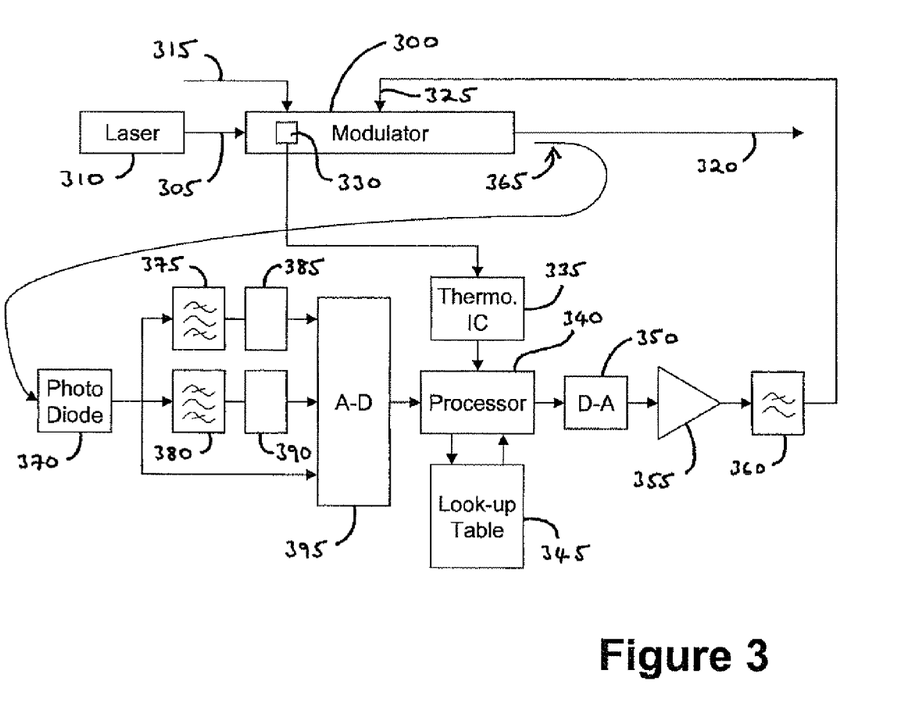
FIG. 3 is an illustrative schematic representation of a bias controller according to exemplary embodiments of the present invention, linked to an electro-optic modulator.

Referring firstly to FIG. 3, an illustrative schematic diagram is provided of a bias controller for controlling the bias voltage to be applied to an electro-optic modulator 300 such as an MZI modulator as described above. The modulator 300 has an optical input 305 for receiving an optical carrier signal from a laser 310, a signal input 315 for receiving a modulating electrical signal, for example a radio frequency (RF) signal, and an optical output 320 for outputting the modulated optical carrier signal. The modulator 300 is provided with a bias voltage input 325 for receiving a bias voltage to enable a predetermined bias point to be achieved and maintained.

In order for the apparatus in this exemplary embodiment to determine the level of bias voltage required, the modulator 300 is provided with a temperature sensor 330 which may include a thermocouple, thermistor, diode-connected transistor or diode, and may be either attached to the casing of the modulator 300 for the purpose of estimating the temperature of the modulator 300 itself or it may be integrated within the modulator substrate itself to give a more precise reading of temperature. The temperature sensor 330 is linked to a corresponding interfacing circuit, for example a thermometry integrated circuit (IC) 335 for converting an output of the temperature sensor 330 into a digital signal for input to a processor 340. The processor 340 is also linked to a store for storing a look-up table 345 that contains information relating modulator temperature to bias voltage. The processor 340 is arranged to execute a bias control algorithm as will be described in an exemplary embodiment below. The processor 340 may include a microcontroller, a digital signal processor (DSP) chip or a Field-Programmable Gate Array (FPGA), for example.

The look-up table 345 may be pre-populated for each modulator 300 for which the bias controller is to be connected, or the table 340 may be populated automatically by the bias control algorithm that will be described in detail below. In either case, the look-up table 345 is intended to store, for each resolvable temperature point, e.g. for every $1/8^{th}$ of a degree Celsius for a typical thermometry IC, the correct bias voltage to be applied to the modulator 300. An output of the processor 340 is linked to a digital to analogue (D-A) converter 350 for converting a digital representation of a bias voltage determined by reference to the look-up table 345 to an analogue DC voltage signal. The DC voltage signal is amplified if necessary in a buffer amplifier 355 and output via a low-pass filter 360 to the bias voltage input 325 of the modulator 300.

The bias control algorithm when executing on the processor 340 is arranged to make periodic measurements of the modulator temperature and to determine and output a corresponding bias voltage to the modulator 300 to ensure that the modulator 300 continues to operate in the required region of its transfer characteristic, for example at quadrature. Assuming that the look-up table 345 is populated with the required values for bias voltage at each temperature point, then the bias controller may operate without interruption. However, where the look-up table 345 is empty or not fully populated with information, then the bias control algorithm is required to determine the required bias voltage for a given modulator temperature and to populate the look-up table 345 with the missing information automatically, as will now be described with further reference to FIG. 4.

Figure 4:
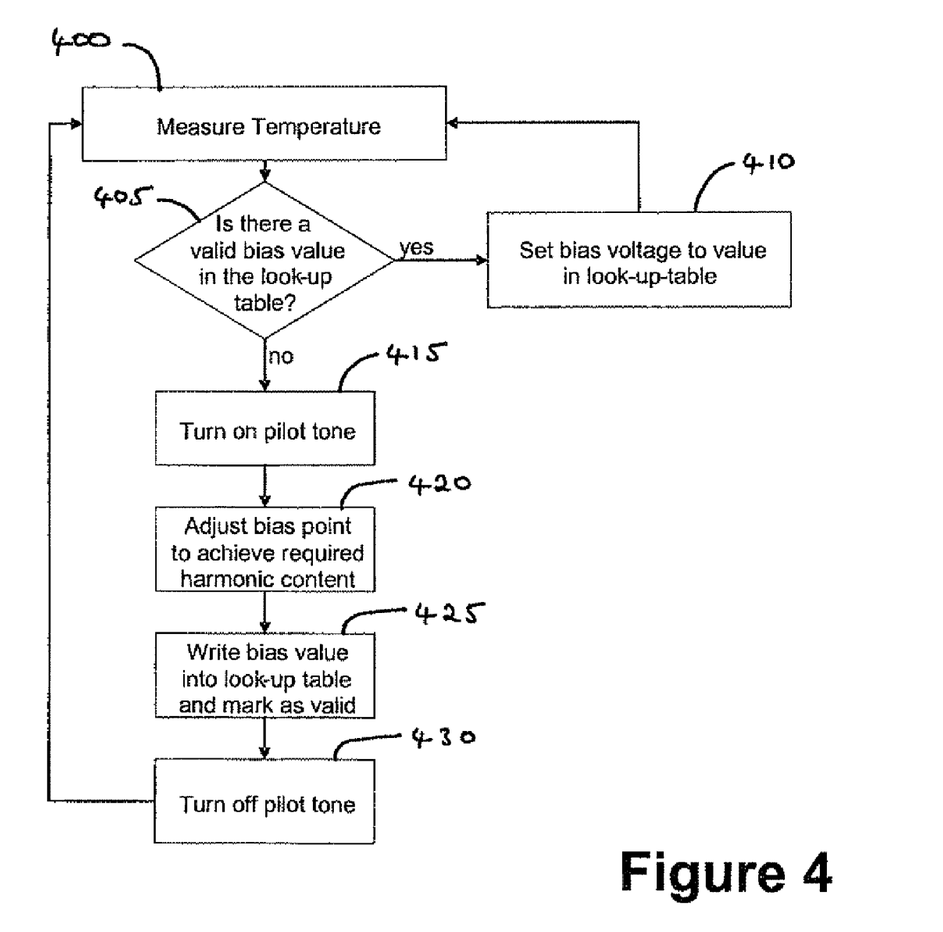
FIG. 4 is a flow diagram showing steps in operation of an exemplary bias control algorithm for execution on a bias controller according to exemplary embodiments of the present invention.

Referring further to FIG. 4, a flow diagram is provided to show exemplary steps in operation of an exemplary bias control algorithm for execution on the processor 340, in particular for the purpose of automatically populating the look-up table 345. At STEP 400 the processor 340 makes a periodic measurement of the temperature of the modulator 300 by reading the output of the thermometry IC 335, as described above. At STEP 405, the processor 340 determines whether, for the current measured temperature, there is a value stored in the look-up table 345 for the corresponding bias voltage. If there is, then at STEP 410 the processor 340 is arranged to read the value of the bias voltage from the look-up table 345 and to generate a bias voltage signal to apply to the bias voltage input 325 of the modulator 300, as described above.

If, at STEP 405, for the current measured temperature, there is no corresponding value for bias voltage stored in the look-up table 345 then, at STEP 415, the processor 340 is arranged to initiate a process to determine the corresponding bias voltage automatically. Firstly, at STEP 415, the processor 340 is arranged to generate a digital representation of a pilot tone which, when output to the D-A converter 350, is converted into an analogue pilot tone of frequency $f_0$, possibly in the range of 10 to 100 kHz, e.g. 20 kHz. The pilot tone is amplified (355) and filtered in the low pass filter 360 to ensure that the pilot tone has high spectral purity. The pilot tone is applied to the bias voltage input 325 to the modulator 300 and it may be combined with a DC bias voltage signal being supplied at the same time to the modulator 300. Alternatively, the processor 340 may be arranged to activate a separate analogue source of a high-quality pilot tone of frequency $f_0$. The pilot tone may be input more directly to the modulator 300, either to the bias voltage input 325 or to the modulating signal input 315, in the latter case mixed with any modulating signal being applied at the same time.

At STEP 420, the processor 340 is arranged to make adjustments to the bias voltage being applied to the modulator 300 and to monitor the effects of those adjustments on the harmonic content of the modulated optical carrier signal being output by the modulator 300 at the optical output 320. To achieve this, an optical tap coupler 365 may be provided at the optical output 320 of the modulator to tap between 1 and 5% of the power of an optical output signal. The tapped optical signal is fed to a low-bandwidth photodiode 370 for conversion to an electrical signal. A low-bandwidth photodiode is used so that it will be responsive to changes in light intensity at the frequency of the pilot tone and its lower order harmonics but relatively unresponsive to changes due to the radio frequency (RF) modulation. This has the advantage that any filtering that would otherwise be required to isolate the pilot tone frequencies of interest from the RF modulation, if a high bandwidth photodiode were used, is avoided.

As an alternative to an optical tap coupler 365, a photodiode 370 may be integrated into the modulator 300 itself, coupled for example into the effanescent field above the modulator waveguide 11, or an integrated monitor photodiode/reflective tap may be used with the modulator 300 to achieve the same purpose.

The electrical signal output by the photodiode 370 is filtered in band-pass filter 375, centered on the fundamental pilot tone frequency $f_o$, and in a band-pass filter 380 centered on the frequency of the second harmonic of the pilot tone, $f_1$. The amplitudes of the signals output by each filter 375, 380 may then be monitored, allowing the bias controller to determine when the modulator 300 is operating at a required bias point. When the modulator 300 is operating at a quadrature point, the signal amplitude at the fundamental pilot tone frequency ($f_0$) will be substantially at a maximum and the signal amplitude at the second harmonic frequency ($f_1$) will be substantially at a minimum. If the modulator 300 is operating at a minimum or a maximum bias point in the transfer characteristic, then the signal amplitude at the fundamental pilot tone frequency ($f_0$) will be substantially at a minimum and the signal amplitude at the second harmonic frequency ($f_1$) will be substantially at a maximum. To distinguish between operation at the maximum or the minimum bias point, information is required on the DC content of the output signal power. This can be determined by the processor 340 by analysing the output of the photodiode 370 after digitisation in an analogue to digital (A-D) converter 395. If the DC content of the signal power is high, then the modulator 300 is operating at a maximum bias point; if there is no DC content then the modulator 300 is operating at a minimum bias point.

To assist in detecting extreme signal amplitudes—maxima or minima—in the filtered signals, peak level detectors 385, 390 are provided, arranged to monitor the amplitude of each filtered signal. The output of each peak level detector 375, 380 is digitized by the A-D converter 395 and supplied to the processor 340 for further analysis to determine when the modulator 300 is operating at a required bias point.

On detecting a respective indication that the modulator 300 is operating at the required bias point, the processor 340 writes the currently received modulator temperature and the currently applied bias voltage to the look-up table 345 in respect of that bias point. The pilot tone is then turned off. The process may then repeat when a new temperature point is detected for which there is no corresponding bias voltage value stored in the look-up table 345. If required, this process may be executed during scheduled or ad-hoc periods when the modulator 300 is not being used for modulation. This process has the advantage that it may be executed very rapidly, with minimum disruption to the operation of the modulator 300. Moreover, because the pilot tone may be applied briefly and predictably, the signal amplitude of the pilot tone may be much larger than would normally be employed, allowing more accurate minimisation of the second harmonic, a point which may otherwise be difficult to detect accurately above the noise floor in the output signal. This in turn will yield an increase in modulator linearity when used in quadrature bias.

An automated process has been described with reference to FIG. 4 for populating the look-up table 345 that is suitable for use during operation of the modulator 300. However, an alternative process may be implemented to populate the look-up table 345 or to determine the information required during a pre-installation or pre-delivery phase, for example at manufacture. This process may be a manual or semi-automated process. In one such process, a modulator 300 is placed in an oven and its temperature varied slowly. The modulator 300 is linked to an optical carrier source and a pilot tone is applied to the modulator 300. At each required temperature point the harmonic content of the resultant optical output is monitored while a variable bias voltage is applied to the modulator 300. The bias voltage that results in a minimum output signal power at the frequency of the second harmonic of the pilot tone, and the measured modulator temperature, are written to a memory for subsequent population of the look-up table 345. In this example, those voltages would be the bias voltages for maintaining quadrature. However, as discussed above, different signal conditions and other frequencies, for example at the fundamental frequency of the pilot tone, may be used to determine the bias voltage required for other bias points of the modulator, at each temperature point. Variations on this process would be apparent to a person of ordinary skill in this field.

To take account of long term degradation of the modulator 300, the bias controller of the present invention may be arranged periodically to fully repopulate the look-up table 345.

A bias controller according to exemplary embodiments of the present invention is largely a digital implementation, allowing it to be easily scaled, reusing much of the hardware of the apparatus to control the bias of a number of modulators. For example, the design of the bias controller may be extended to control multiple modulators by using multi-input A-D (395) and multi-output D-A (350) converters, a single processor 340 and a larger look-up table 345. If the temperature match is good between a number of modulators in a system (i.e. they are co-located and there is a slow rate of temperature change), then the bias controller according to the present invention may be operable to control the bias of all the modulators using a single temperature measurement device.

With minor adjustment to the contents of the look-up table 345 and the process for determining bias voltages automatically, one or more modulators 300 may be set by the bias controller to operate at quadrature, minimum, maximum, or any other arbitrary bias point, as would be apparent to a person of ordinary skill in this field on the basis of the information provided above.

Exemplary embodiments of the present invention may find application in very high-speed digital links, where the removal of a dither tone of a conventional bias controller may increase the maximum possible data rate and/or link length.

To safeguard against long-term drift, a system including a bias controller according to the present invention may periodically check the information in the look-up table 345 by applying the pilot tone on request, or (for example) a short time after power-up. If a significant error in a required bias point is detected, then re-calibration may be performed or advised.

The invention claimed is:

1. A method for controlling the bias of an electro-optic modulator, comprising:
   (i) receiving an indication of the temperature of the modulator;
   (ii) accessing a look-up table to determine a value of bias voltage corresponding to the received indication of modulator temperature, for a required bias point;
   (iii) generating a bias voltage of said determined value for application to the modulator; and (iv) if, at (ii), the look-up table does not contain a value for bias voltage for the required bias point, performing the following:
(v) generating a pilot tone for input to the modulator;
(vi) determining the signal content of a modulated optical signal output by the modulator to thereby recognize operation of the modulator at the required bias point;
(vii) if, at (vi), the modulator is not operating at the required bias point, adjusting the value of bias voltage for application to the modulator;
(viii) repeating (vi) and (vii) until operation at the required bias point is recognized; and
(ix) storing the respective value of bias voltage and the received indication of modulator temperature in said look-up table.

2. The method of claim 1, wherein at (vi), the determining of the signal content includes monitoring the amplitude of signals in the modulated optical signal at the frequency of the pilot tone and at the frequency of the second harmonic of the pilot tone.

3. The method of claim 2, wherein at (vi), the required bias point is a maximum or a minimum bias point of the modulator, recognizable by a substantially minimum signal amplitude at the fundamental frequency of the pilot tone and a substantially maximum signal amplitude at the frequency of the second harmonic of the pilot tone.

4. The method of claim 2, wherein at (vi), the required bias point is a quadrature bias point of the modulator, recognizable by a substantially maximum signal amplitude at the fundamental frequency of the pilot tone and a substantially minimum signal amplitude at the frequency of the second harmonic of the pilot tone.

5. A method for configuring a bias controller, having a modulator, for controlling the bias of an electro-optic modulator, the method comprising:
(i) receiving an indication of the temperature of the modulator;
(ii) generating a pilot tone for input to the modulator;
(iii) generating a bias voltage for application to the modulator;
(iv) determining a signal content of a modulated optical signal output by the modulator to recognize operation of the modulator at a required bias point;
(v) if, at (iv), the modulator is not operating at the required bias point, adjusting the value of the generated bias voltage;
(vi) repeating (iv) and (v) until operation at the required bias point is recognized; and
(vii) for the required bias point, writing the respective value of bias voltage and the received indication of modulator temperature to the look-up table in the store of the bias controller;
wherein the bias controller includes:
an input for receiving an indication of the temperature of the modulator,
a generating arrangement to generate a bias voltage to be applied to the modulator,
a storing arrangement to store a look-up table containing, for each of a plurality of temperature points, a corresponding bias voltage to be applied to the modulator in respect of a required bias point, and
a control arrangement to determine, with reference to the look-up table, a bias voltage to be applied to the modulator for a received indication of a modulator temperature.

6. The method of claim 5, further comprising:
(viii) on receiving an indication of a different modulator temperature, repeating (ii) to (vii) in respect of said different modulator temperature.

* * * * *

UNITED STATES PATENT AND TRADEMARK OFFICE
CERTIFICATE OF CORRECTION

PATENT NO. : 8,203,777 B2  
APPLICATION NO. : 12/305621  
DATED : June 19, 2012  
INVENTOR(S) : Andrew James Smith et al.

Page 1 of 1

It is certified that error appears in the above-identified patent and that said Letters Patent is hereby corrected as shown below:

On the title page, at item 30, change "(EP) 07270069" to -- (EP) 07270069.3 --

Signed and Sealed this  
Seventh Day of May, 2013

Teresa Stanek Rea  
*Acting Director of the United States Patent and Trademark Office*